Aug. 17, 1965  E. I. CROYLE  3,201,799
DISPENSER MECHANISM FOR MOLDING APPARATUS
Filed April 22, 1963  2 Sheets-Sheet 1
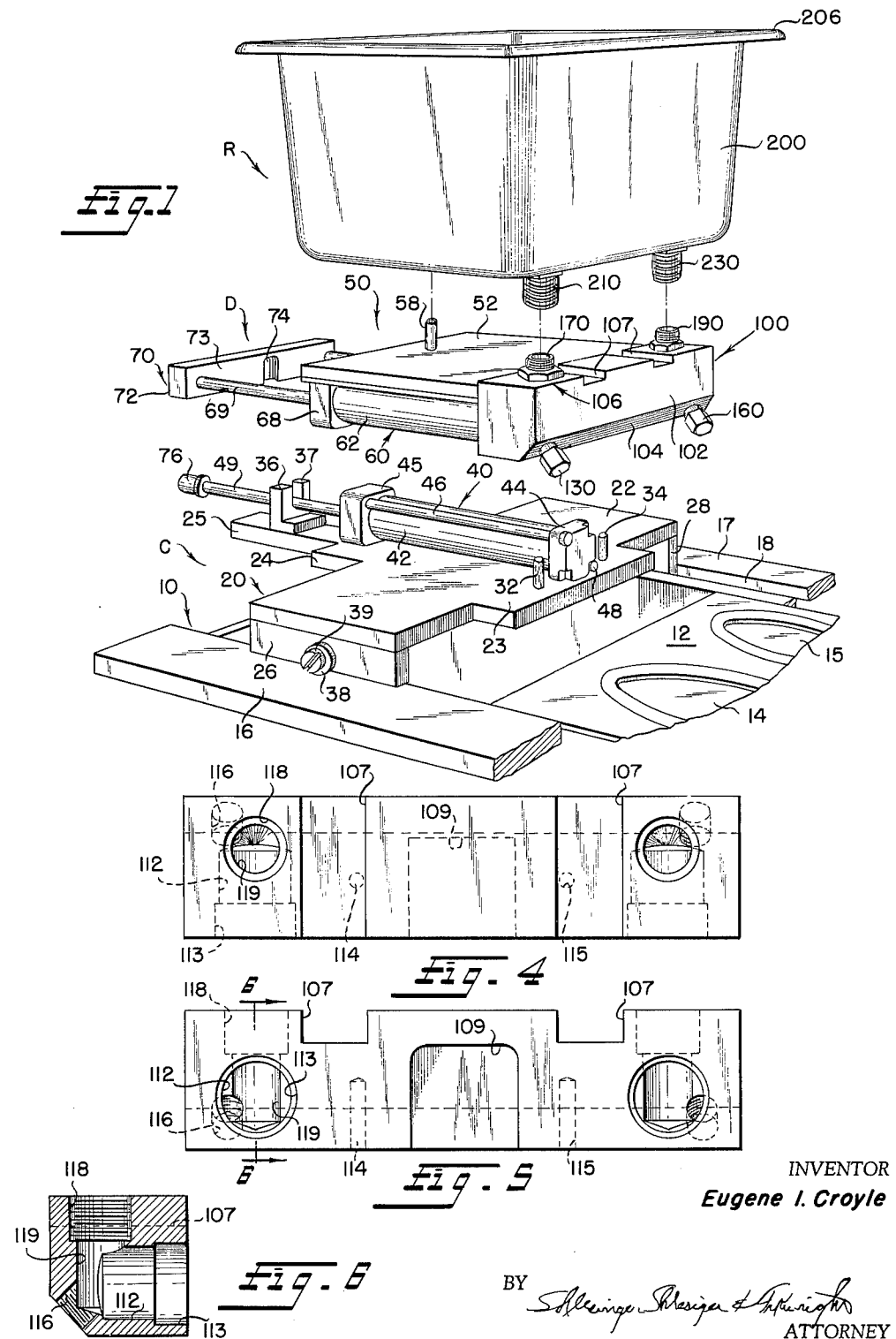
INVENTOR
Eugene I. Croyle
BY
ATTORNEY Aug. 17, 1965  E. I. CROYLE  3,201,799
DISPENSER MECHANISM FOR MOLDING APPARATUS
Filed April 22, 1963  2 Sheets-Sheet 2
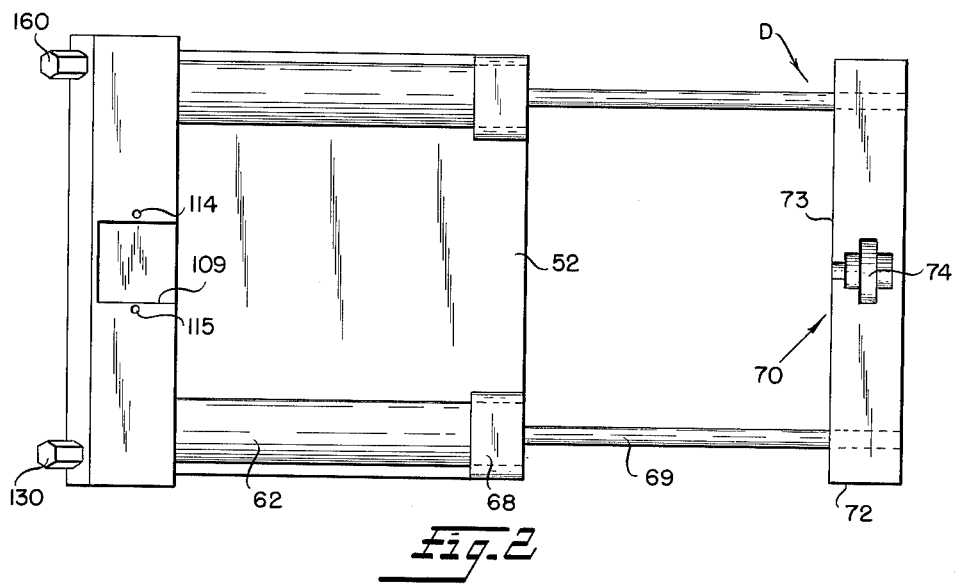
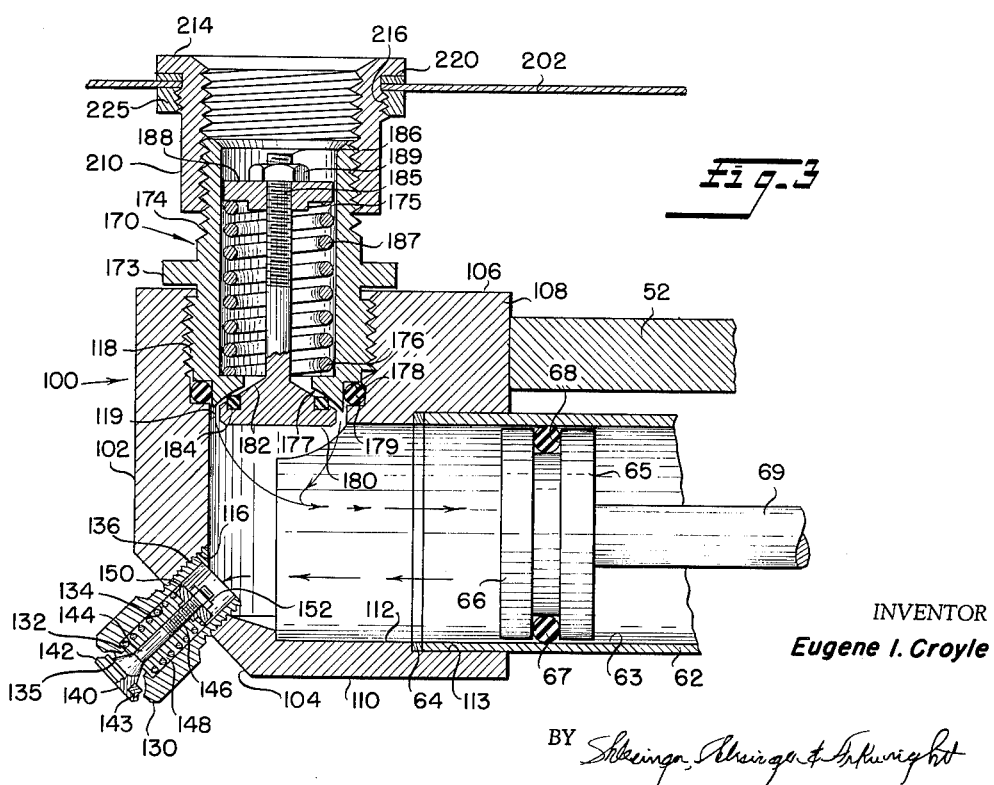
INVENTOR
Eugene I. Croyle
ATTORNEY

United States Patent Office 3,201,799
Patented Aug. 17, 1965

3,201,799
DISPENSER MECHANISM FOR MOLDING APPARATUS
Eugene I. Croyle, San Angelo, Tex., assignor to American Research and Development Company, San Angelo, Tex., a corporation of Texas
Filed Apr. 22, 1963, Ser. No. 274,547
9 Claims. (Cl. 18—30)

This application is a continuation-in-part of my copending application entitled Molding Apparatus having Serial No. 252,474, filed January 18, 1963.

This invention relates to dispenser apparatus, and more particularly to dispenser apparatus for liquid plastic molding machines.

The selection of the type of apparatus used for a given molding process depends to a large measure upon the overall cost factor. This is determined by such considerations as output per man hour, cost of the machinery and maintenance thereof, and whether highly skilled operators are required to operate the apparatus.

Accordingly, it is an immediate object of this invention to provide apparatus which will be relatively inexpensive to produce, will have high output, and will require only semi-skilled operators.

A further object of my invention is to provide apparatus in which the entire product is molded at a single station.

A further object of my invention is to provide apparatus in which a matched pair of units may be produced simultaneously.

It is also a further object of my invention to provide apparatus in which the dispenser mechanism is moved in a horizontal plane relative to the open mold cavity.

A further object of my invention is to provide dispenser apparatus which is readily adjusted to dispense an accurate amount of molding material.

A still further object of my invention is to provide a dispensing mechanism of simple construction which utilizes a piston as the active element to prime and to empty the dispensing cavity.

A still further object of the invention is to provide a dispensing assembly which can be readily removed to facilitate the change from one type of molding material to another.

Other objects and advantages of my invention reside in the details of construction, arrangement, combination of the various parts of my apparatus as hereinafter more fully set forth, as specifically pointed out in my claims, and illustrated in the accompanying drawings.

FIGURE 1 shows a perspective view of the molding machine with the dispenser and reservoir assemblies disengaged from the carriage member for illustrative purposes.

FIGURE 2 shows an underside view of the dispenser carriage.

FIGURE 3 shows a cross-sectional view of part of the dispenser assembly.

FIGURE 4 shows a top plan view of the dispenser head block.

FIGURE 5 shows a rear elevational view of the dispenser block.

FIGURE 6 is a cross-sectional view of line 6—6 of FIGURE 5.

Referring to the drawings, and particularly to the assembly of FIGURE 1, the base of the molding machine generally indicated at 10 supports mold retaining plate 12 which holds mold cavities 14 and 15. Horizontal side support members 16 and 17 extend along the length of the base 10 and adjacent to molding plate holder 12.

A slot 18 is formed in plate 17 and extends for a substantial distance along the side of molding plate 12. This slot accommodates supporting strut 28 which moves carriage 20 in a horizontal plane to a position directly over cavity molds 14 and 15 so that molding material can drop into the mold cavities from the dispenser.

Carriage 20 has a top plate section 22 integrally attached to strut 28 and extends in a generally horizontal plane to support the dispenser assembly. It has a forward projecting portion 23 and two rear projecting portions 24 and 25. The support block 26 supports the other side of plate 22 and has a bearing 38 which is fastened thereto by a screw member 39. The bearing 38 is in rolling engagement with the horizontal side plate 16.

A fluid power cylinder assembly generally designated at 40 is shown attached to the intermediate section of plate 20 and has head and rear block members 44 and 45 which are connected by a rod 46. The head of a second rod 48 similar to rod 46 is also shown.

The block members 44 and 45 hold a fluid cylinder 42 in position. A piston rod 49 for the piston of this unit is supported by a bracket having upstanding portions 36 and 37.

The dispenser assembly generally designated as D is supported on the forward projection 23 of the carriage plate and held in position by upstanding lugs 32 and 34.

The flat plate member 52 is integrally connected with the dispenser head assembly generally designated at 100 and with dispenser cylinder units generally designated at 60.

Referring to FIGURE 2, it can be seen that the dispenser assembly comprises the dispenser head assembly 100 to which two separate identical dispenser cylinder units 62 are attached, all of said units being held integral with plate 52, and the piston rods of the cylinder units being connected by a common actuating yoke assembly 70.

The dispenser cylinder units are a conventional cylinder and piston assembly with a piston 65 which extends through rear support block 68 and has a straight reciprocable piston rod 69 integral therewith.

Referring to FIGURE 3, it can be seen that the cylinder 62 has an inner surface 63 and piston 65 has a groove in which a washer 67 is positioned.

The end of the cylinder is disposed within the opening 113 of block 104 and has a sealing gasket 64 at the end thereof, the members being securely held together by means not illustrated.

The movement of the piston 65 is controlled through piston rod 69 which is connected to the power cylinder assembly 40 through the yoke assembly 70.

Piston rod 69 is connected to yoke block 73 at end 72. Both fluid cylinders are connected in the same manner and disposed symmetrically with respect to each other and to a central notch section 74 of the yoke block 73. The notch is of a special configuration to fit over a retaining washer 76 on piston rod 49 of power cylinder assembly 40, to give a tight fitting and readily detachable connection. The movement of the power cylinder piston rod 49 when engaged with the yoke block 73 reciprocates the yoke assembly and in turn moves the piston 65 of the dispenser cylinders to either fill or empty the dispenser cavities.

It should be noted that both the dispenser and reservoir assemblies are readily detachable from the carriage merely by lifting the assemblies up so that pins 32 and 34 and holding washer 76 are respectively disengaged from receiving openings 114 and 115 of the dispenser block and cavity 74 of the yoke block 73. This permits the operator to quickly switch from one type of molding fluid to another merely by substituting a different dispenser and reservoir assembly for the one previously used with an absolute minimum of down-time. Accordingly an operator can quickly change from one color molding material to another or change from one type of molding material to another, with no requirement for special tools, cleaning of equipment, etc.

Referring to FIGURE 3, which shows a cross-sectional view of one of the two identical dispenser head cavities, it will be noted that the block forms with the valve connections and the piston assembly a completely closed cavity wherein the movement of the piston in an outward direction draws molding fluid into the cavity through the upper supply valve assembly 170, and when the piston is moved forward to diminish the volume of the chamber, the fluid pressure opens nozzle valve 170 so that fluid is forced out of the cavity through it. For descriptiive purposes only one of these cavities will be described it being understood that the second cavity is identical with the first.

The dispenser head assembly 100 as shown in FIGURE 1 consists of a block 102 which has a lower front face 104 in which the nozle valve members 130 and 160 are mounted. A top face 1006 has supply valve members 170 and 190 inserted therein, all of the valve members connecting with their respective cavity within the block as illustrated in FIGURE 3. Rear face 108 of block 102 is connected to the dispenser support plate 52 to provide a support for the parallel spaced cylinder members 62 as well as the reservoir.

The cavity is formed by the intersection of the bores 112 and 119 which are respectively cut in rear face 108 and top face 106 as can be seen in FIGURES 4 and 5. A small counterbore 113 is made in rear face 108 to accommodate dispenser cylinder member 62 so that there is clear communication between the cavity and the reciprocable piston 65. The check valve nozle casing 130 is shown inserted through bottom inclined face 104 and into the cavity through tapped opening 116, the threaded section 136 of the casing threadedly engaging opening 116. A bore 132 is drilled through casing 130 to the shoulder 132 and on the other side of the shoulder concave surface 135 is provided to accommodate the tapered surface 142 of valve member 140. A gasket member 143 engages the surface 135 in fluid tight contact when the valve is closed. The valve is held in closed postiion by the spring member 148 which is placed in the bore 134 in abutting relation with shoulder 132 and stop nut 150. The stop nut is in threaded engagement on the threaded section 146 of valve shaft 144 and is locked in position by lock nut 152.

The supply valve assembly 170 is inserted in the tapped opening 118 which is coaxial with bore 119 to provide a supply connection for the fluid molding material between the reservoir R and the dispenser head cavity. The flange 173 has a hexagonal configuration to permit the use of a wrench in connecting and disconnecting the valve assembly from the dispenser head block. The externally threaded section 174 of the valve is screwed into the internally threaded opening of connecting member 210 of the reservoir to provide a rigid connection between the dispenser head block and the reservoir, the direction of the threads 118 and 174 being such that when the flange 173 is turned by a wrench to disconnect it, the member will unscrew from both the reservoir and the dispenser head.

The valve construction 170 is similar to that as set forth for the nozzle valve 130 and has a valve member which extends through and into an internal bore 175 of the casing, the casing has a shoulder 176 and on the other side of the shoulder an external concave surface 177 to receive the valve head 180. The external surface of the inner extremity of the valve casing has a groove 178 in which an O-ring is disposed, for sealing purposes.

The engaging surface 182 of the valve head 180 has a gasket 184 which is held in normal sealing engagement therewith under the force exerted by spring 187 located in the casing cavity 175. One end of the spring engages shoulder 176 and the end engages holding nut 188 which can be adjustably moved because of its threaded engagement with the threads 185 on the valve shaft 186. The lock nut 189 prevents the movement of holding nut 188 after it has been adjusted for the desired spring tension.

The reservoir coupling member 210 threadedly engages the supply valve 170 to assist in holding the reservoir in position on the dispenser assembly, and has an end flange 214 which holds a sealing washer 220 against the inner surface of the bottom of the reservoir 202, tension being applied by an internally threaded lock nut 225 which engages a threaded section 216 on the connecting member.

The construction of the dispenser cavity and the nozzle valve 160 and supply valve 190 are identical with the above description for the dispenser head assembly as shown in FIGURE 3.

Referring to FIGURES 4 and 5, a central cut out cavity 109 is shown for providing clearance to accommodate block 44 of power cylinder assembly 40. These figures show the exact location of the bores 112, 118, and 116 previously referred to in the description of FIGURE 3. The receiving bores 114 and 115 for the holding pins 32 and 34 are also shown in these figures.

Referring to the reservoir, which is generally designated as R, it will be seen that it is directly supported by the threaded connecting members 210 and 230 on the dispenser assembly; the rear portion of the reservoir is supported by the stud 58, the latter being integral with the plate 52 of the dispenser assembly.

The reservoir 200 is a deep hollow container which has a cover 206, the cover being removable for filling purposes. The fluid molding material flows from the container to the dispenser cavities of the block simultaneously through supply valves 170 and 190 on outward movement of the yoke assembly 70.

*Operation*

The operator of the machine first fills the reservoir with molding fluid which is usually a liquid plastisol composition.

Appropriate controls, not shown in this application, but described in the parent application are then activated and the sequence of operation of the machine begins.

The carriage assembly is moved forward by strut member 28 which is activated by a fluid cylinder assembly not shown, carrying the dispenser and reservoir assemblies forward therewith to move over the open mold cavities 14 and 15.

The pair of last assemblies which fit over the open mold cavities are not shown in this application, but are fully described in the parent application referred to above. When the last assembly reaches the maximum upright position, it activates a three-way roller cam valve and this supplies pressure to the dispenser drive cylinder (not shown) which in turn initates movement of dispenser carriage strut member 28 to advance the assembly over the mold cavities.

As the dispenser advances, a second cam valve (not shown) is activated and the fluid cylinder 40 has fluid pressure supplied thereto to move its piston in a forward direction thereby moving the yoke assembly 74 toward the dispenser head block 100. This moves the dispenser pistons forward toward the front of the dispenser cavity and thereby forces molding fluid out through the nozzle valves, from which it drops to the open mold cavities.

It should be noted that the stroke of the dispenser pistons may be varied by changing the position of the bracket 37, which may be used as a stop for the yoke assembly, or alternatively, the position of engaging washer 76 on rod 49 may be changed, these changes of position permitting the quantity of plastisol dispensed to be varied according to the need.

At the end of the forward stroke the dispenser carriage is in the extreme forward position and remains in this position until another molding cycle is started. Such a cycle is started by pressing a button which automatically reverses the pressure on the cylinders to move the carriage back away from the molds and at the same time recharging the dispenser cavities by moving the dispenser cylinder pistons back to increase the volume of the cavity and simultaneously draw new molding fluid into the cavity through the supply valves between the cavity and the reservoir, the dispenser is shown in this position in FIGURE 1.

While the invention has been described in connection with preferred embodiments thereof, it will be understood that it is capable of further modification, and this application is intended to cover any variations, uses, or adaptations of the invention following, in general, the principles of the invention and including such departures from the present disclosure as come within known or customary practice in the art in which the invention pertains, and as may be applied to the essential features hereinbefore set forth and as fall within the scope of the invention or the limits of the appended claims.

Having thus described my invention what I claim is:

1. A molding apparatus for footwear, comprising,
    (a) a table having an open central section;
    (b) a pair of horizontally disposed matched open molds within said central section;
    (c) a carriage supported at one end of said table above and adjacent said molds and movable horizontally thereover;
    (d) a fluid power cylinder mounted on said carriage and having a piston rod which extends outwardly in a horizontal direction away from said molds;
    (e) a liquid molding material dispenser for each of said mold cavities directly supported on said carriage;
    (f) each of said dispensers having an activating piston and an elongated rod, said rod being parallel and connected to said power cylinder piston rod so that movement thereof will activate said dispensers;
    (g) and a reservoir supported on said carriage and connected to said dispensers for supplying liquid molding material to said dispensers.

2. The molding apparatus for footwear as set forth in claim 1, wherein an adjustable stop member is provided on said carriage for varying the movement of said piston rod so that the volume of molding material dispensed by dispensers can be varied.

3. The molding apparatus for footwear as set forth in claim 1 wherein said elongated rods of said dispensers are connected by a yoke block, which has a central notch section which fits over and engages a retaining washer on said piston rod of said fluid power cylinder, said carriage having a bracket which acts as a stop member for forward travel of said piston rod.

4. The molding apparatus for footwear as set forth in claim 1, wherein said reservoir is integrally connected with said dispensers to form a unit, said dispensers having interlocking means for engaging said carriage and said piston rod, so that said dispensers and said reservoir may be quickly disengaged from said carriage and power cylinder as a unit to permit substitution of a second similar reservoir and dispenser unit.

5. The molding apparatus for footwear as set forth in claim 4, wherein the dispensers are held on said carriage by vertically disposed lug members.

6. A molding apparatus for footwear, comprising:
    (a) a table having an open central section;
    (b) a pair of horizontally disposed matched open molds disposed within said central section of said table;
    (c) a carriage supported on one end of said table at a level above and adjacent said molds, and movable horizontally over said molds;
    (d) a fluid power cylinder mounted on said carriage and having a piston rod which extends outwardly in a horizontal direction away from said molds;
    (e) a block member mounted on said carriage transverse to the line of movement of said carriage and having a pair of internal hollow cavities aligned with said mold cavities, each of said cavities extending to the rear face of said block member;
    (f) an elongated hollow cylinder connected to each of said cavities and extending rearwardly of said block member and parallel to each other, and having a piston therein;
    (g) each of said pistons having an elongated rod which extends outwardly from the other end thereof and is connected to said piston rod of said fluid power cylinder;
    (h) a dispensing check valve aligned with each of said mold cavities and mounted on the front face of said block member, each of said check valves being connected with its respective cavity to permit fluid under pressure to pass from said cavity and through said dispenser check valve;
    (i) a pair of inlet check valves mounted on the top of said block member and connected one each to its respective cavity to permit passage of fluid molding material into said cavity when a vacuum is created by outward movement of said piston members;
    (j) a reservoir directly supported on said block member and movable therewith and connected to said inlet check valves to supply fluid molding material thereto, whereby fluid molding material is supplied to each of said cavities on outward movement of said piston members; and
    (k) said pistons of said elongated hollow cylinders being activated simultaneously by said fluid power cylinder whereby fluid is dispensed simultaneously to each of said hollow mold cavities.

7. The dispenser assembly as set forth in claim 6 wherein said carriage has a flat plate member on which said block member and said parallel elongated hollow cylinders are mounted, and said fluid power cylinder is also mounted, said plate having a stop member which controls the stroke of the piston of said fluid power member.

8. The dispenser assembly as set forth in claim 6, wherein said inlet check valves directly support and hold said reservoir in position on said block member.

9. The molding apparatus for footwear as set forth in claim 6, wherein said reservoir is a deep hollow container having a removable cover whereby said container may be easily refilled.

References Cited by the Examiner

UNITED STATES PATENTS

| | | | |
|---|---|---|---|
| 2,602,189 | 7/52 | Finelt | 18—30 |
| 2,621,365 | 12/52 | Deschamps | 22—70 XR |
| 2,737,686 | 3/56 | Harkenrider | 18—30 |
| 2,842,160 | 7/58 | Rekettye | 18—30 XR |
| 3,001,234 | 9/61 | Renier | 18—30 |
| 3,090,078 | 5/63 | Ackles | 18—48 |

MICHAEL V. BRINDISI, *Primary Examiner.*